Patented Dec. 11, 1945

2,390,629

UNITED STATES PATENT OFFICE 2,390,629

METHOD FOR PREPARING PHENYL-PENTACHLORO-ETHANE

Viktor Weinmayr, Pitman, N. J., assignor to E. I. du Pont de Nemours & Company, Wilmington, Del., a corporation of Delaware No Drawing. Application December 8, 1943, Serial No. 513,479

5 Claims. (Cl. 260—651)

This invention relates to new processes for the preparation of phenyl-pentachloro-ethane, and especially to processes of preparing the compound from alpha-trichloro-acetophenone.

Phenyl-pentachloro-ethane was prepared from ethyl benzene by H. Biltz [Annalen 296, page 271 (1897)]. The method is circuitous and in general it is unsatisfactory for the manufacture of the compound except on a laboratory scale.

It is, therfore, an object of this invention to provide methods for the preparation of phenyl-pentachloro-ethane from readily available starting materials. Another object of the invention is to provide processes which can be carried out easily on a large scale by the use of readily available plant equipment. Other objects of the invention will be apparent from the following description.

These objects are accomplished by treating alpha-trichloro-acetophenone with phosphorus pentachloride at elevated temperatures and separating the product from the reaction mixture by suitable means. The reaction is represented by the equation

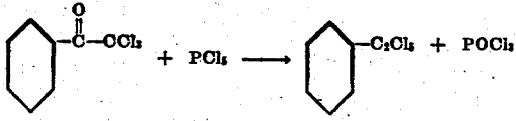

In view of the known labile character of the chlorine atoms in alpha-trichloro-acetophenone, it was surprising that no side reactions or decompositions took place under the drastic reaction conditions hereinafter set forth, and that a conversion approaching near to quantitative conversion to phenyl-pentachloro-ethane could be accomplished.

The invention will be more fully set forth in the following more detailed description which includes examples that are given as illustrative embodiments of the invention and not as limitations thereof. Parts are expressed in parts by weight unless otherwise noted.

Example

Six hundred and ten parts of alpha-trichloro-acetophenone and 900 parts of phosphorus pentachloride are heated to 170°–180° C. for 24 hours. The phosphorus oxychloride which forms during this period is allowed to distill off. The reaction mass is then poured on ice containing 750 parts of carbon tetrachloride. The resulting solution of phenyl-pentachloro-ethane is washed acid-free, dried, and distilled. Seven hundred parts of phenyl-pentachloro-ethane are obtained.

The product distills at 110° C. under 1 mm. pressure and has a crystallizing point of 35.7° C. When molten, the product is a colorless clear liquid.

Alpha-trichloro-acetophenone may be prepared by heating a mixture of benzene, trichloro-acetyl-chloride and anhydrous aluminum chloride at about 40°–45° C. until the evolution of hydrochloric acid has practically stopped, and then recovering the product from a benzene layer which forms upon drowning the resulting reaction mixture in ice. Alpha-trichloro-acetophenone thus obtained has a boiling point of 85° C. at 1 mm. pressure.

Phenyl-pentachloro-ethane has been found to be especially useful as an intermediate from which various other novel and useful organic compounds can be prepared.

Instead of carrying out the process at 170°–180° C. and allowing the phosphorus oxychloride to distill, the process can be carried out under reflux, in which case distillation temperatures at least as high as about 120° C. can be used. Equivalent amounts of phosphorus trichloride and chlorine can be used in the reaction mixture instead of phosphorus pentachloride. If desired, the phenyl-pentachloro-ethane can be separated from the reaction mass by distillation at distillation temperatures. The best yields are obtained when a considerable excess of available chlorine is present in the form of phosphorus pentachloride or its equivalent.

This is a continuation in part of my copending application Serial No. 413,167, Patent No. 2,351,247.

From the foregoing disclosure it will be recognized that the invention is susceptible of modification without departing from the spirit and scope thereof and it is to be understood that the invention is not restricted to the specific illustrations thereof herein set forth.

I claim:

1. A process of making phenyl-pentachloro-ethane which comprises heating a mixture of alpha-trichloro-acetophenone and phosphorus pentachloride at a temperature of about 120° C. to about 180° C. until phenyl-pentachloro-ethane is formed, and separating the product from the reaction mixture.

2. The process in accordance with claim 1 in which an excess of phosphorus pentachloride over an equimolecular proportion thereof is used.

3. The process in accordance with claim 1 in which the reaction temperature is about 170° C. to about 180° C. and the phosphorus oxychloride formed during said heating is allowed to distill from the reaction mixture.

4. The process in accordance with claim 1 in which the reaction mixture is heated to a temperature at least as high as about 120° C. and sufficient to reflux the phosphorus oxychloride formed in the reaction mixture, and the heating is done under reflux.

5. The process in accordance with claim 1 in which the phosphorus pentachloride is formed in the reaction mixture by adding phosphorus trichloride and chlorine to the reaction mixture in amounts sufficient to form phosphorus pentachloride.

VIKTOR WEINMAYR.